US008889747B2

(12) United States Patent
DiGenova et al.

(10) Patent No.: US 8,889,747 B2
(45) Date of Patent: Nov. 18, 2014

(54) FISCHER TROPSCH REACTOR WITH INTEGRATED ORGANIC RANKINE CYCLE

(75) Inventors: Kevin J. DiGenova, Brighton, MA (US); George A. Huff, Jr., Naperville, IL (US); Barbara B. Botros, Vernon, CT (US); John G. Brisson, Rockport, MA (US)

(73) Assignees: BP Corporation North America Inc., Houston, TX (US); Massachusetts Institute of Technology, Cambridge, MA (US)

( * ) Notice: Subject to any disclaimer, the term of this patent is extended or adjusted under 35 U.S.C. 154(b) by 315 days.

(21) Appl. No.: 13/270,563

(22) Filed: Oct. 11, 2011

(65) Prior Publication Data

US 2013/0090395 A1   Apr. 11, 2013

(51) Int. Cl.
| | | |
|---|---|---|
| *C07C 27/00* | (2006.01) | |
| *F01K 25/08* | (2006.01) | |
| *C10G 2/00* | (2006.01) | |
| *F01K 13/00* | (2006.01) | |
| *F01K 7/02* | (2006.01) | |
| *F01K 3/18* | (2006.01) | |

(52) U.S. Cl.
CPC ... *F01K 3/18* (2013.01); *C10G 2/34* (2013.01); *F01K 25/08* (2013.01); *F01K 13/00* (2013.01); *F01K 7/02* (2013.01); *Y02E 50/32* (2013.01)
USPC .............................. 518/728; 518/700; 60/651

(58) Field of Classification Search
USPC ...................... 518/700, 728; 60/651
See application file for complete search history.

(56) References Cited

U.S. PATENT DOCUMENTS

| | | | |
|---|---|---|---|
| 3,040,528 | A | 6/1962 | Tabor et al. |
| 5,486,542 | A | 1/1996 | Posthuma et al. |
| 6,855,248 | B1 | 2/2005 | Olivier et al. |
| 7,225,621 | B2 | 6/2007 | Zimron et al. |
| 2005/0010066 | A1 | 1/2005 | Lin |
| 2008/0118018 | A1 | 5/2008 | Schrauwen |
| 2009/0012189 | A1 | 1/2009 | Routier et al. |
| 2009/0158641 | A1 | 6/2009 | Hayes et al. |
| 2010/0071368 | A1 | 3/2010 | Kaplan et al. |
| 2010/0105127 | A1 | 4/2010 | Ginsburg |
| 2010/0247392 | A1* | 9/2010 | Onishi et al. ............ 422/140 |
| 2010/0280135 | A1 | 11/2010 | Doty |
| 2010/0280207 | A1* | 11/2010 | Van Derschrick ........... 526/348 |
| 2010/0300093 | A1 | 12/2010 | Doty |

FOREIGN PATENT DOCUMENTS

| | | |
|---|---|---|
| EP | 2 017 291 A1 | 1/2009 |
| WO | WO 02/060841 A2 | 8/2002 |
| WO | WO 2005/004255 A2 | 1/2005 |
| WO | WO 2009/071609 A1 | 6/2009 |

OTHER PUBLICATIONS

Andersen, W.C. et al., "Rapid Screening of Fluids for Chemical Stability in Organic Rankine Cycle Applications," Industrial Engineering and Chemistry Research, (2005) 5560-5566.
Doty, F.D., et al., "A Dual-Source Organic Rankine Cycle (DORC) for Improved Efficiency in Conversion of Dual Low- and Mid-Grade Heat Sources," Proceedings of the ASME 2009 3$^{rd}$ International Conference of Energy Sustainability, San Francisco, CA (2009).
Fox, J.M., et al., "Slurry Reactor Design Studies," DOE Project No. DE-AC22-89PC89867 (1990).
Jain, M.L., et al., "Determination of Thermal-Degradation Rates of Some Candidate Rankine-Cycle Organic Working Fluids for Conversion of Industrial Waste Heat into Power," Argonne, IL: Argonne National Lab (1984).
McAllister, Robert A., "Alternative Energy: Sources with Strings Attached," InTech, Jan. 1981, pp. 41-43.
Prins, Mark J., et al., "Exergetic optimization of a production process of Fischer-Tropsch fuels from biomass," Fuel Processing Technology 86 (2004 375-389.
Steynberg, A.P., et al., "Fischer-Tropsch Technology," Studies in Surface Science and Catalysis 152, 2004.
Van Bibber, L., et al., "Baseline Technical and Economic Assessment of a Commercial Scale Fischer-Tropsch Liquids Facility," DOE/NETL (2007).
International Search Report mailed Jan. 30, 2013 for corresponding application PCT/US2012/059666 (3p).
Written Opinion of the International Searching Authority mailed Jan. 30, 2013 for corresponding application PCT/US2012/059666 (4p).
Quoilin, Sylvain, et al., "Technological and Economical Survey of Organic Rankine Cycle Systems," 5$^{th}$ European Conference on Economics and Management of Energy in Industry, Vilamoura, Algarve, Portugal, Apr. 14-17, 2009, (12 pgs.).

* cited by examiner

*Primary Examiner* — Jafar Parsa
(74) *Attorney, Agent, or Firm* — Brinks Gilson & Lione

(57) ABSTRACT

A process for recovering heat uses a product stream from a Fischer Tropsch synthesis reactor as the coolant in the same Fischer Tropsch reactor. This stream is then used as the working fluid in an associated organic Rankine cycle. In this manner, the waste heat from the Fischer Tropsch reactor can be efficiently converted into shaft work within the Fischer Tropsch plant. The Fischer Tropsch fluid can then be recycled into the plant product stream.

25 Claims, 5 Drawing Sheets

FISCHER TROPSCH REACTOR WITH INTEGRATED ORGANIC RANKINE CYCLE

BACKGROUND

Fischer Tropsch synthesis is a catalyzed process for converting synthesis gas (syngas) containing hydrogen and carbon monoxide into longer chain hydrocarbon products. Since its invention by Franz Fischer and Hans Tropsch during the 1920s, this process and variations on it have been commonly used in coal to liquids and gas to liquids operations. The Fischer-Tropsch condensation process is a reaction which converts carbon monoxide and hydrogen into longer chain, mostly paraffinic, hydrocarbons in the presence of an appropriate catalyst and typically at elevated temperatures (e.g., 100 to 350° C., 125 to 300° C., or preferably 175 to 250° C.) and/or elevated pressures (e.g., 5 to 100 bar, or preferably 12 to 50 bar). The Fischer Tropsch reaction is exothermic, yielding roughly 145 kJ per "$CH_2$" formed. The Fischer-Tropsch process can be used to prepare a range of hydrocarbon fuels, including LPG, naphtha, kerosene and gas oil fractions. Fischer Tropsch product selectivity is temperature and pressure dependent, so it is important for the heat of reaction to be quickly removed in order to achieve the desirable product mix and avoid catalyst damage. Increased temperatures may result in undesirable methane selectivity or carbon deposition. Steynberg, Andre, and Mark Dry. *Fischer-Tropsch Technology*. Amsterdam:4: Elsevier, 2006. Boiling water is commonly used as a coolant in Fischer Tropsch reactors, and the steam formed therefrom can be used to generate shaft work.

The concept of an organic Rankine cycle dates back at least as far as 1962, when H. Tabor and L. Bronicki patented vapor turbines with the object of providing "a method for the operation of turbines based upon the Rankine cycle in which the vapors leaving the exhaust are normally superheated". See U.S. Pat. No. 3,040,528 to Tabor et al. By implementing a recuperator system, Tabor and Bronicki were able to improve the efficiency of a Rankine cycle based on the use of heavy fluids to be comparable to or better than the efficiency of a similar system based on the use of steam. Organic Rankine cycles have evolved over the last fifty years and are now widely used methods for generating electricity from low temperature heat sources. See Quoilin, Sylvain, and Vincent Lemort. *"Technological and Economical Survey of Organic Rankine Cycle Systems." 5th European Conference on Economics and Management of Energy in Industry* (14-17 Apr 2009).

Many working fluids for these organic Rankine cycles have been proposed and developed. Recent patents include the development of a working fluid that is a "commercially available organic, which is operable under a broad range of temperatures, is thermally stable, has a high auto-ignition temperature, low freezing point and high critical temperature and is benign to the environment, and safe for human use." See U.S. Pat. No. 7,225,621 to Zimron et al., which is herein incorporated by reference. The Fischer Tropsch process has been suggested as a potential heat source for one variation of an organic Rankine cycle called a Dual-Source Organic Rankine Cycle (DORC). The inventor of the DORC has stated that "there are a number of very important (and neglected) cases where substantial amounts of low-grade and mid-grade waste heat may be available simultaneously. Fischer-Tropsch Synthesis (FTS) reactors reject hundreds of megawatts at 500 K to 650 K, and lesser amounts are rejected in condensers at lower temperatures." See U.S. Patent Appl. Pub. No. 20100300093A1 (Ser. No. 12/673,554.) filed 25 Nov. 2007 to Doty, F. D. entitled "High-Temperature Dual-Source Organic Rankine Cycle with Gas Separations," which is herein incorporated by reference. Accordingly, there is an opportunity to develop improved processes for recovering the waste heat from a Fischer Tropsch process using an organic Rankine cycle.

SUMMARY

In one embodiment of the invention, a process uses a product stream from a Fischer Tropsch synthesis reactor as the coolant in the same Fischer Tropsch reactor. This stream is then used as the working fluid in an associated organic Rankine cycle. In this manner, the waste heat from the Fischer Tropsch reactor can be efficiently converted into shaft work within the Fischer Tropsch plant. The Fischer Tropsch fluid can then be recycled into the reactor product stream.

In another embodiment of the invention, a process for the recovery of waste heat includes introducing a stream of a high-pressure organic liquid coolant into a cold side of a reactor heat exchange system, where the coolant provides cooling, preferably at a near-constant temperature condition, of the reactor by vaporizing the coolant into a coolant vapor stream, removing the coolant vapor steam from the cold side of the reactor heat exchange system, introducing the coolant vapor stream into an organic Rankine cycle to generate work and convert the coolant vapor stream into a high pressure liquid coolant, and complete the loop by re-introducing the high pressure liquid coolant into the cold side of the reactor heat exchange system, wherein the organic liquid coolant is derived from a fraction of a hydrocarbon product formed in the reactor. Preferably, the reactor contains a catalytic Fischer Tropsch reaction process. More preferably, the reactor is a fixed bed Fischer Trospch reactor, a fluid bed Fischer Tropsch reactor or a slurry Fischer Tropsch reactor. Preferably, the organic liquid coolant comprises at least 80% by weight of a $C_6$-$C_{12}$ hydrocarbon, more preferably at least 90% by weight of a $C_6$-$C_{12}$ hydrocarbon, and even more preferably at least 95% by weight of a $C_6$-$C_{12}$ hydrocarbon. Still more preferably, the hydrocarbon is non-aromatic $C_6$. Preferably, the reactor is maintained at a temperature between about 100° C. and about 350° C., more preferably between about 220° C. and about 250° C.

In another embodiment of the invention, a process for the recovery of waste heat includes introducing a stream of an organic liquid coolant into a cold side of the reactor heat exchange system, removing the coolant vapor steam from the cold side of the reactor heat exchange system, introducing the coolant vapor stream into an organic Rankine cycle to recover the heat therefrom and convert the coolant vapor stream into a high pressure liquid coolant, introducing the high pressure liquid coolant into the organic liquid coolant stream, removing a product stream from the reactor, separating the product stream into a plurality of fractions including a coolant fraction, introducing the coolant fraction as a make-up into the organic liquid coolant stream, and removing a purge stream from the organic liquid coolant stream. Preferably, the coolant fraction has a boiling point temperature at the operating pressure of the cold side of the reactor heat exchange system which is about the same as the reactor operating temperature. Preferably, the purge stream is introduced into the product stream removed from the reactor.

Other embodiments and features of the invention will be apparent from the drawings and detailed description that follow.

DETAILED DESCRIPTION

There is an abundance of heat available at low temperatures, e.g., less than about 250° C., in many chemical plants. Steam Rankine cycles are known to be inefficient at this low temperature. In one aspect, the process of the present disclosure differs from the prior art in that it uses a Fischer Tropsch fluid from the reactor product stream as the coolant in the same Fischer Tropsch reactor, and as the working fluid for an organic Rankine cycle which uses the Fischer Tropsch reactor as its major source of heat. This disclosure focuses on a low temperature Fischer Tropsch reaction (220° C.-250° C.) in a fixed bed reactor with cobalt-based catalyst targeting a highly paraffinic product stream. The process is also applicable to other Fischer Tropsch reactor configurations at this and other temperature ranges between 100° C. and 350° C., which may use other catalysts, such as iron-based catalyst for operation at the higher end of the temperature range. Preferably, a distillate fraction taken from the Fischer Tropsch reactor product stream is used as the working fluid for an organic Rankine cycle which has the Fischer Tropsch reactor as its primary heat source. This working fluid can be recycled into the product stream after being used for the organic Rankine cycle.

Figure 1:
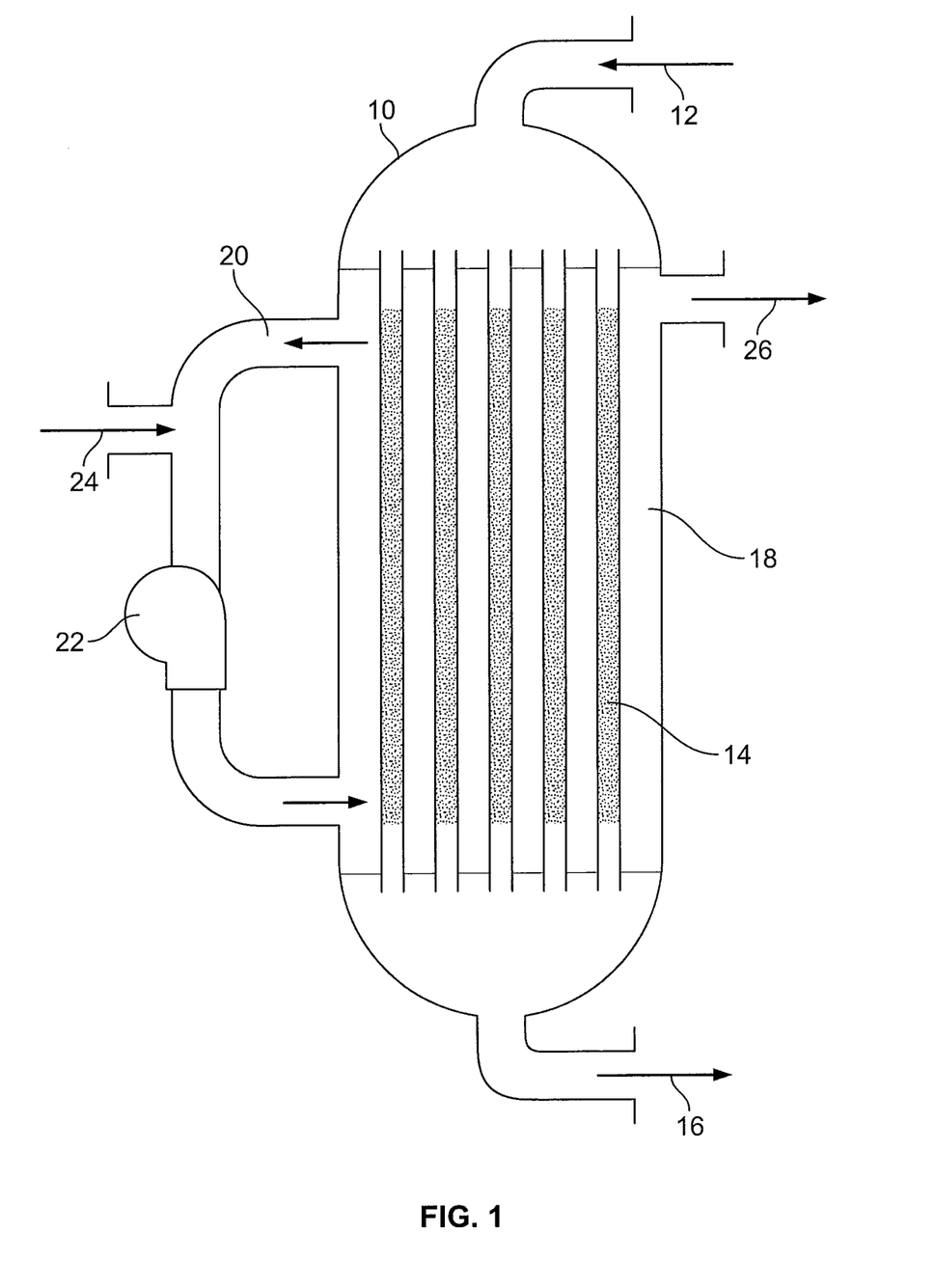
FIG. 1 depicts a representative fixed bed Fischer Tropsch reactor with liquid coolant recirculation.

In a brief overview, referring to FIG. 1, a typical fixed bed reactor 10 for a Fischer Tropsch process is shown. Such reactors are known in the art. See e.g., U.S. Patent Publication. No. 2008/0118018 A1 to Schrauwen. Syngas feed 12 composed primarily of CO and $H_2$ enters the reactor 10 and passes through catalyst packed tubes 14 where the reaction occurs. In the catalyzed reaction, the feed stream is synthesized into a mixture of longer chain hydrocarbons ranging from methane ($C_1$) up to $C_{64}$ and higher. Products flow out the product outlet 16 of the reactor. The products are separated by distillation downstream (not shown). In order to maintain a near constant reactor temperature, coolant is boiled at constant pressure on the shell side 18 of the reactor. The heat transfer coefficient is kept high by maintaining a considerable coolant velocity across the tubes. A coolant recirculation loop 20 with a recirculation pump 22 maintains high coolant velocity across the tubes even if the overall mass flow of coolant through the reactor is small. In order to avoid temperature gradients as fresh coolant is injected into the reactor system, the liquid coolant inlet stream 24 is introduced into the coolant recirculation stream 20. Preferably, the recirculating coolant stream is maintained at a temperature nearly at its boiling point so that a constant temperature is maintained in the reactor and heat is absorbed by the coolant as latent heat so that the coolant boils off and is removed from the reactor at the vapor coolant outlet 26 as a saturated vapor. Preferably, the reactor temperature of between 220° C. and 250° C., and more preferably between 230° C. and 240° C. Over long term operation, the reactor temperature may increase slightly over the life of the catalyst to compensate for catalyst activity loss due to deactivation. The pressure on the cold side of the exchanger may need to be adjusted to maintain the same temperature difference between the cold side and hot side in the reactor to balance the heat transfer and coolant flow rates. Fresh liquid coolant 24 is added to the coolant loop to balance the coolant that is removed as a saturated vapor 26.

Figure 2:
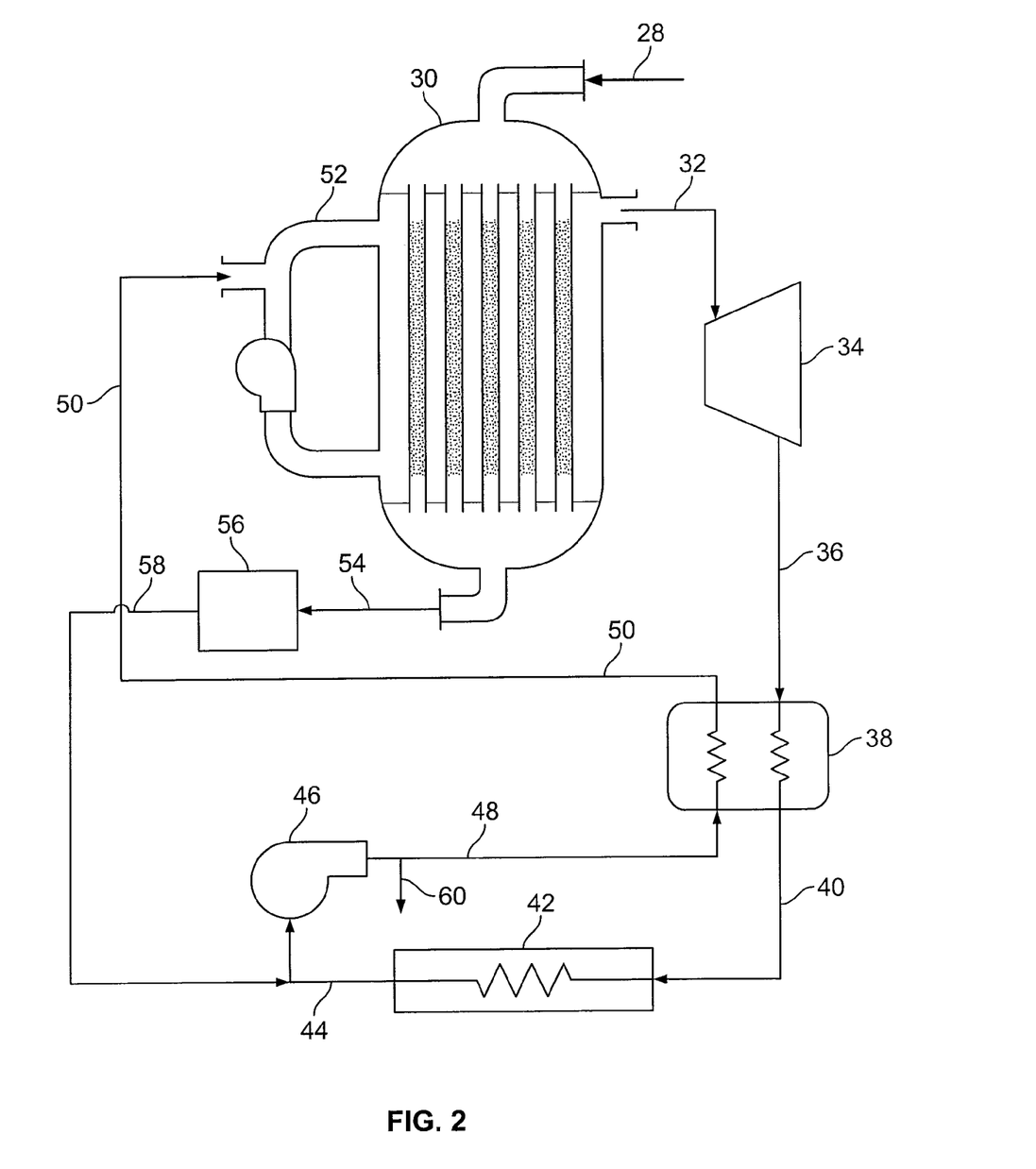
FIG. 2 depicts a representative process flow diagram of a Fischer Tropsch reactor as a heat source for an organic Rankine cycle.

Referring to FIG. 2, a representative process flow diagram is disclosed that incorporates a fixed bed Fischer Tropsch reactor 30 as the heat source integrated with equipment for an organic Rankine cycle. In this representative process flow diagram, saturated coolant vapor 32 is drawn off the top of the reactor 30 and used as the working fluid for an organic Rankine cycle. The relatively high pressure saturated vapor 32 is passed through an expander 34 to generate shaft work. Many organic fluids have a drying nature such that there is no condensation as the fluid is expanded isentropically from a saturated vapor state. Thus, the expander exit stream 36 is superheated vapor, which can be passed through the hot-side of a recuperator 38 to recover heat from the superheated vapor. The lower pressure vapor 40 exits the recuperator 38 and enters a condenser 42, where the vapor is condensed to a saturated liquid stream 44. A working fluid pump 46 pumps the condensed liquid stream 44 to become high pressure stream of liquid coolant 48. The high pressure liquid coolant stream 48 is preheated in the recuperator 38 before being returned as fresh liquid coolant inlet stream 50 to the reactor coolant recirculation loop 52.

In one embodiment, the mass flow rate of the reactor coolant recirculation loop 52 is significantly greater than that of the coolant inlet stream 50. This causes the heat capacity rate of the coolant recirculation loop stream 52 to be greater than the heat capacity rate of the liquid coolant inlet stream 50 so that the reactor tubes will not be exposed to significantly colder temperatures. The coolant recirculation stream 52 may be in the range of 2 to 20, preferably 2 to 10, times the mass flow rate of the liquid coolant inlet stream 50, depending on reactor and Organic Rankine Cycle ("ORC") configuration. For example, with a baseline ORC with no modifications similar to that depicted in FIG. 2, the "coolant inlet 50" may be at a temperature of about 90° C. For practical purposes, this temperature may require a very high mass flow rate ratio of coolant recirculation loop to coolant inlet stream to minimize the decrease in the coolant temperature entering the cold side of the reactor exchanger. Therefore, it is desirable to use an embodiment that integrates additional heat sources from the Fischer Tropsch plant, in addition to what is recovered in the recuperator, to raise the coolant inlet stream temperature before it is introduced into the recirculation loop. In one example, the coolant inlet stream is heated with additional heat sources to about 145° C. The coolant inlet stream is introduced and mixes with the recirculation loop, which is saturated liquid at a temperature of 230° C., before the mixture enters the cold side of the reactor exchanger. It may be desired that the resulting coolant mixture is no more than 5° C. colder than the rest of the coolant in the reactor at 230° C. To obtain a recirculation loop coolant mixture at 225° C. with the coolant inlet stream heated to about 145° C., the recirculation loop should have a mass flow rate about 9 times that of the coolant inlet stream.

In another embodiment with an ORC using hexane including four reheat stages, five expanders, two pressure levels, and split recuperators (not shown), the coolant inlet stream may be at a temperature of 188° C. The coolant inlet stream mixes with the coolant recirculation loop, which is saturated liquid at a temperature of 230° C. It may be desired in this case that the resulting coolant mixture be no more than 10° C. colder than the rest of the coolant in the reactor, at 220° C. To achieve this 220° C. temperature, the recirculation loop must have a mass flow rate about 2 times that of the coolant inlet. In this embodiment, the Fischer Tropsch reactor may supply about 75% of the total heat load for the ORC. The remaining 25% heat load may be provided from related processes in other process units associated with the Fischer Tropsch plant. For example other heat sources at or near the Fischer Tropsch reactor temperature may be used for one or more of the reheat stages between the expander stages. Other heat sources at lower temperatures may be integrated into the ORC to provide heat for lower temperature streams, such as the high pressure coolant pumped back to the reactor exchanger.

Preferably, a distillation fraction of the product from the Fischer Tropsch reactor is used as the liquid coolant. In a typical Fischer Tropsch reaction, the syngas used as the reactor feed stream 28 may be primarily $H_2$ and CO, and may have the following composition by mol fraction: 0.308 CO; 0.028 $CO_2$; 0.619 $H_2$; 0.001 $H_2O$; 0.038 $N_2$; 0.007 Ar; and trace amounts of $O_2$, $CH_4$. A typical reaction product formed in the Fischer Tropsch reactor may be mostly hydrocarbons, predominantly n-alkanes, with some isoparaffins and olefins (mostly alpha-olefins) formed but trace, if any, aromatics. A typical product stream 54 may have the following composition by mol fraction: 0.178 00; 0.049 $CO_2$; 0.333 $H_2$; 0.324 $H_2O$; 0.063 $N_2$; 0.011 Ar; and hydrocarbons, 0.025 ($C_1$-$C_4$); 0.008 ($C_5$-$C_{11}$), 0.005 ($C_{12}$-$C_{22}$), 0.004 ($C_{23}$-$C_{64}$). The product stream 54 is sent to a distillation unit 56. Conventional distillation fractionation units as known in the art for distillation of Fischer Tropsch reaction products may be used. See, e.g. U.S. Pat. Nos. 5,486,542 to Posthuma et al. and 6,855,248 to Olivier et al., which are herein incorporated by reference. To obtain the distillation cut purity desirable for the organic Rankine cycle of the present disclosure may require subjecting the initial distillation fraction to subsequent distillations or taking a side cut from the distillation tower. The desired distillate from the product is sent as fresh working fluid make-up 58 to the organic Rankine cycle portion of the process. Preferably, the fresh working fluid make-up is introduced to the condensed liquid stream 44 at the inlet to the working fluid pump 46. A stream of working fluid bleed may be removed from the high pressure working fluid stream 48 at the outlet of the working fluid pump 46. The fraction used as make-up may be primarily $C_6$-$C_{12}$ non-aromatic hydrocarbons, predominantly $C_6$-$C_{12}$ n-alkanes, or naphtha. The fraction may have a boiling point range from 20° C. to 220° C., more preferably a boiling point range from 30° C. to 100° C. The distillate fraction used as make-up may be a full range naphtha fraction having a boiling point range from 20° C. to 220° C., or a light naphtha narrower boiling range from 30° C. to 100° C. Preferably, the fraction used as fresh working fluid make-up is at least 80% by weight of a $C_6$-$C_{12}$ hydrocarbon, the same hydrocarbon as used in the working fluid. More preferably, the fresh working fluid make-up is at least 90%, and most preferably at least 95% by weight of a $C_6$-$C_{12}$ hydrocarbon. Preferably the hydrocarbon is non-aromatic $C_6$ hydrocarbon, such as but not limited to a $C_6$ alkane.

Although a tighter-boiling hydrocarbon fraction is preferred, a broader boiling hydrocarbon fraction may be acceptable. Using the experimental modeling discussed below, state points for an ORC with a fluid mixture of 90% n-hexane, 5% pentane, and 5% heptane by mass were calculated. With the same set of assumptions as used for pure hexane as the working fluid in the organic Rankine cycle, the 90% n-hexane mixture has a temperature glide of about 0.6° C. during isobaric boiling (i.e., it no longer stays at constant temperature during phase change between states 68 and 80 on FIG. 3), and about 3.5° C. during isobaric condensing. The cycle with the 90% n-hexane fluid mixture is 25.9% efficient. The cycle with pure hexane is 26.3% efficient. (A steam cycle with the same set of assumptions is 20.6% efficient.).

There are myriad benefits to using a boiling cut of the Fischer Tropsch (FT) reactor product stream to recover heat in the FT reactor. For example, leaks between the shell side and the tube side of the reactor have little consequence, because the coolant (or working fluid) is one of the reactor products. Also, the FT plant provides an immediate source of working fluid such that the organic fluid can be continuously refreshed to maintain the integrity of the cycle as degradation of the working fluid occurs over time. Most organic Rankine cycles must operate in a limited temperature range to assure chemical stability, with maximum temperature usually ranging from 100° C. to 300° C. By constantly refreshing the fluid, the upper temperature limit can be increased, because products of degradation are removed. Higher input temperatures lead to even more efficient cycles.

Figure 3:
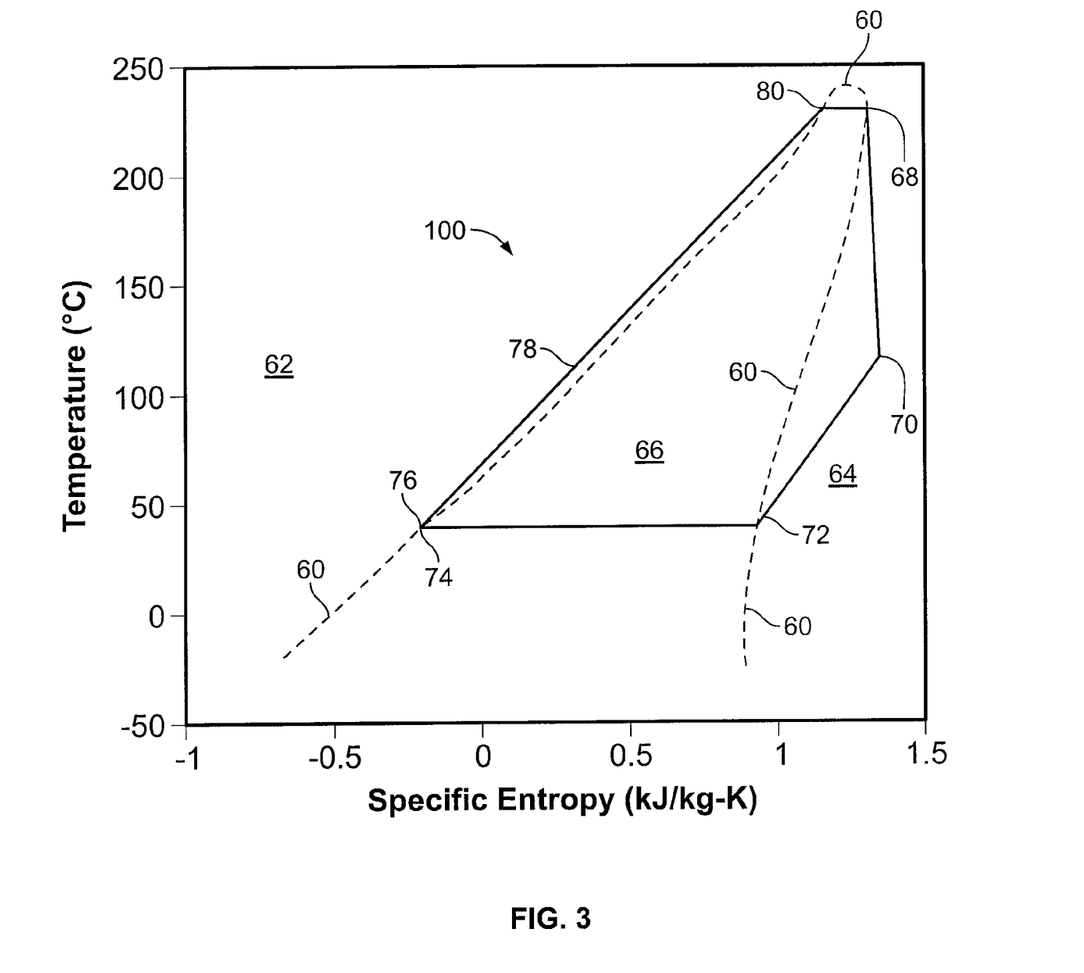
FIG. 3 depicts a representative Temperature—Entropy diagram of a Rankine cycle obtained from the process flow of FIG. 2 using n-hexane as the working fluid.

Referring to FIG. 3, a representative energy cycle for the organic Rankine cycle corresponding to the process flow diagram of FIG. 2 is depicted. The energy cycle 100 is depicted based on a model of the organic Rankine cycle using pure n-hexane as the liquid coolant/working fluid. The loci of saturated states for n-hexane are depicted as a dashed line 60 forming a loop on the diagram, where liquid phase 62 is to the left of the loop, vapor phase 64 is to the right of the loop and a mix of saturated liquid and saturated vapor 66 is inside the loop. In the process, saturated coolant vapor 68 is withdrawn from the reactor. As the saturated vapor is passed through the expander to extract shaft work from the stream, the temperature cools under near isentropic conditions to become a superheated vapor 70. The superheated vapor passes through a recuperator to further cool down to become a near saturated vapor stream 72 slightly above the saturation temperature. The vapor stream 72 passes through a condenser to become a saturated liquid 74. The saturated liquid is pumped to a higher pressure 76 and pre-heated in the recuperator to form the liquid coolant stream 78, where it is introduced to the recirculating reactor coolant stream 80. The shaft work recovered in this energy cycle is represented by the near isentropic expansion of the saturated vapor from point 68 to 70 on the energy cycle 100.

Experimental Modeling

A plant process simulation model has been created to study strategies for maximizing resource efficiency by simultaneously producing liquid fuels, chemicals, and power from a coal gasification process. Typical plant heat flows indicate an abundance of heat available at low temperatures (less than 250° C.) where steam Rankine cycles are known to be inefficient. The single largest source of low temperature heat used in the plant process simulation model is the Fischer Tropsch reactor, which converts syngas into useful liquids and waxes. This exothermic reaction rejects a significant heat load, but must be held at a preferred operating temperature of 240° C. to produce the desired products. Based on the experimental modeling, the use of organic working fluids in a Rankine cycle is a more efficient option than steam for converting the heat from the Fischer Tropsch reactor into shaft work.

For this work, fluids are modeled as pure substances, unless otherwise noted, using the thermodynamic database compiled by the National Institute of Standards and Technology (NIST) in Refprop 8.0 (Lemmon, Huber, & McLinden, NIST Standard Reference Database 23: Reference Fluid Thermodynamic and Transport Properties-REFPROP, Version 8.0. Gaithersburg, Md., 2007). Fluid states for process side heat loads from the Fischer Tropsch reactor and related processes are calculated using the Peng-Robinson equation of state with the Boston-Mathias alpha function (PR-BM) in Aspen Plus® modeling software by Aspentech.

TABLE 1

Variables used to represent thermodynamic properties

| | |
|---|---|
| h | specific enthalpy |
| s | specific entropy |
| T | Temperature |
| P | Pressure |
| Q | Quality |

Figure 4:
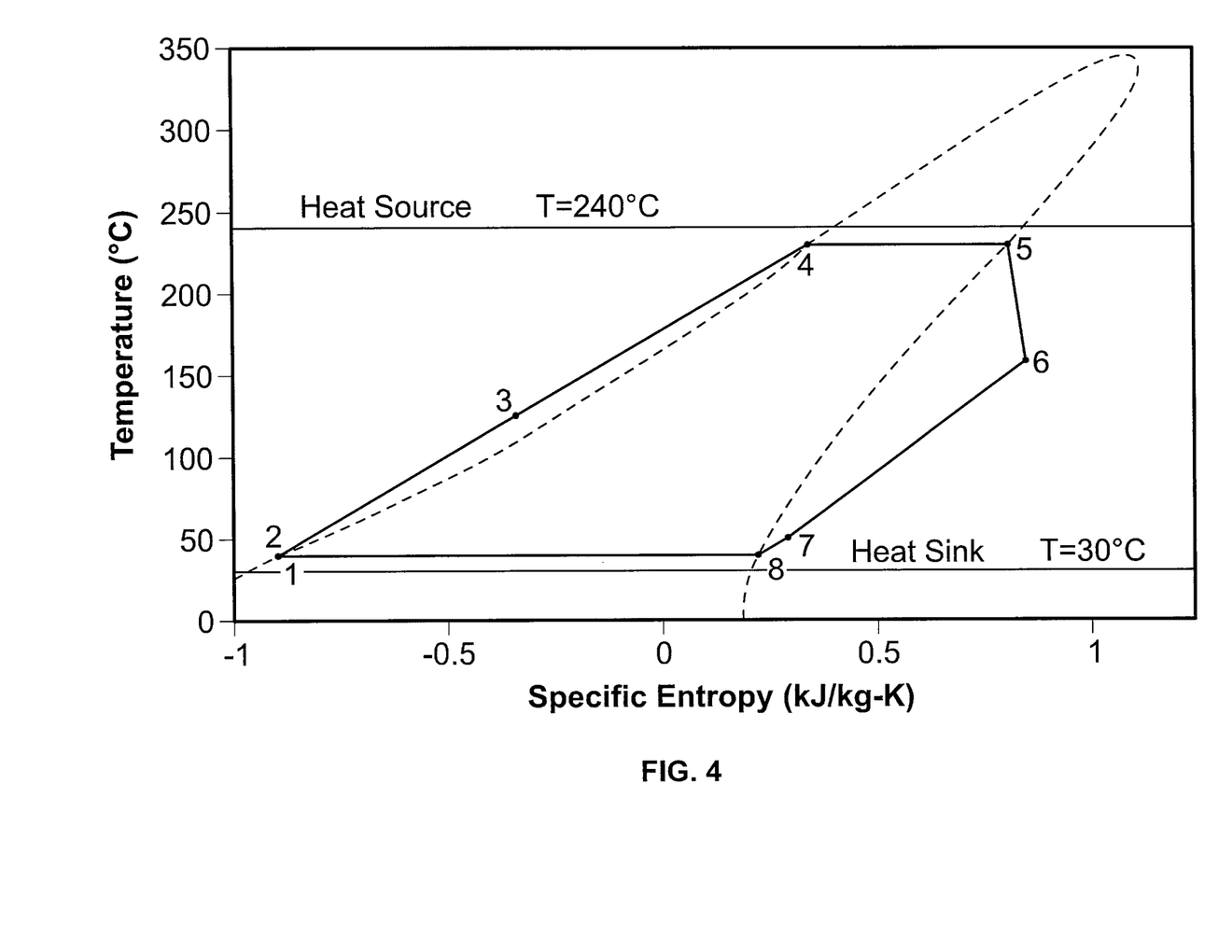
FIG. 4 depicts a representative Temperature—Entropy diagram of a Rankine cycle obtained from the process flow of FIG. 2 using n-decane as the working fluid.

The organic Rankine cycle (ORC) model employed in this discussion for dry fluids operates between a heat source at high temperature, $T_{source}$, and a heat sink at low temperature, $T_{sink}$. FIG. 4 shows the fluid states for an organic Rankine cycle on a Temperature vs. Specific Entropy (T-s) diagram. Decane is used as the working fluid in this example. The fluid saturated states which are the boundary of the two-phase region are represented by a dashed line on the T-s diagram. The cycle begins at State 1 as a saturated liquid at low pressure, $P_{low}$, and at the cycle minimum temperature, $T_{min}$. The fluid is pumped up to high pressure, $P_{high}$, at State 2. The high pressure liquid is then preheated from State 2 to State 4, and boiled from State 4 to State 5 by heat transfer from the heat source. (State 3 has been skipped here for reasons that will become clear shortly.) Due to its drying nature, the fluid can be expanded directly from a saturated vapor at State 5 to a superheated vapor state at low pressure at State 6. The low pressure vapor is then cooled and condensed back into a low pressure liquid at State 1.

One consequence of expanding a dry fluid is that the expander exit stream, State 6 in FIG. 4, is a superheated vapor at elevated temperature such that $T_6 > T_{min}$. Therefore, there is an opportunity to transfer heat from the low pressure vapor stream into the high pressure liquid stream as part of the preheating process that occurs from State 2 to State 4. A recuperator is added to recover heat from the superheated expander exit stream, thereby reducing the necessary heat input to operate the cycle. The hot vapor enters the recuperator directly out of the expander at State 6, and exits the recuperator at low temperature at State 7. The cold stream enters the recuperator as high pressure liquid at State 2 and exits the recuperator at some elevated temperature at State 3.

Cycle states are calculated as described here. State 1 is saturated liquid at a temperature slightly above the heat sink temperature to assure heat transfer such that $T_1 = T_{sink} + \Delta T_{min}$. State 1 determines the low pressure isobar for the organic Rankine cycle, $P_{low} = P_1$. The high pressure, $P_{high}$, is determined by the expander inlet condition at State 5. No superheating is required for the dry fluid, so State 5 is a saturated vapor with a temperature slightly below the heat source temperature such that $T_5 = T_{source} - \Delta T_{min}$. Consequently, the high pressure for the cycle is the saturation pressure for the fluid at temperature $T_5$ such that $P_{high} = P_5 = P_{sat}(T_5)$.

With the high and low pressures defined, the remaining state points can be determined. State 4 is a saturated liquid at high pressure, $P_4 = P_{high}$. State 2 is defined by first assuming the pump is reversible, yielding state $2_{rev}$ which corresponds to an isentropic pressurization from State 1 such that $P_{2,rev} = P_{high}$ and $S_{2,rev} = s_1$. Having defined state $2_{rev}$, an isentropic pump efficiency, $\eta_{pump}$, is used to find $h_2$, thus defining State 2. In the same manner, a reversible expander exit State $6_{rev}$ can be found where $P_{6,rev} = P_{low}$ and $S_{6,rev} = s_5$. The specific enthalpy of State 6 is then determined by assuming an isentropic expander efficiency, $\eta_{exp}$.

As seen in FIG. 4, the organic Rankine cycle with a dry working fluid has State 3 and State 7 associated with the recuperator. The hot vapor stream in the recuperator (State 6 to State 7) has a smaller specific heat capacity than the cold liquid stream (State 2 to State 3). Therefore, the recuperator will pinch at the cold end such that $T_7 = T_2 + \Delta T_{min}$. State 7, which is at pressure $P_{low}$ and temperature $T_7$, is now fully defined, The enthalpy of State 3 is determined by evaluating the First Law of Thermodynamics on a control volume surrounding the recuperator.

Table 2 contains the state information for an organic Rankine cycle as described above. The working fluid for this cycle is decane. The heat source is waste heat from a plant process at a constant temperature of 240° C., the heat sink is cooling water at a constant temperature of 30° C., and a minimum temperature potential of $\Delta T_{min} = 10°$ C. is maintained between the working fluid and the source or sink for all states. Pump and expander efficiencies are set at $\eta_{pump} = \eta_{exp} = 0.9$.

TABLE 2

Organic Rankine cycle states for a decane cycle with heat source and sink of 240° C. and 30° C. respectively. The expander and pump have isentropic efficiencies of 0.9.

| State | specific enthalpy h (kJ/kg) | specific entropy s (kJ/kg-K) | Temperature T (° C.) | Pressure P (kPa) | Quality Q |
|---|---|---|---|---|---|
| 1 | −338.74 | −0.894 | 40 | 0.4867 | 0 |
| 2rev | −338.26 | −0.894 | 40.1 | 348.6 | Subcooled |
| 2 | −338.19 | −0.894 | 40.1 | 348.6 | Subcooled |
| 3 | −124.85 | −0.295 | 128.0 | 348.6 | Subcooled |
| 4 | 164.30 | 0.345 | 230 | 348.6 | 0 |
| 5 | 400.13 | 0.814 | 230 | 348.6 | 1 |
| 6rev | 227.54 | 0.814 | 149.5 | 0.4867 | Superheated |
| 6 | 244.82 | 0.854 | 157.3 | 0.4867 | Superheated |
| 7 | 31.45 | 0.287 | 51.0 | 0.4867 | Superheated |

Cycle characteristics for this organic Rankine cycle using decane are included in Table 3. Comparative numbers using pure n-hexane and a 90% hexane mixture are also provided. The steam Rankine cycle characteristics are also included to facilitate a comparison between the two cycles.

TABLE 3

Organic Rankine cycle characteristics for a decane cycle with heat source and sink of 240° C. and 30° C. respectively. Steam Rankine cycle results for a comparable cycle are included. Expander and pump efficiencies are assumed to be 0.9.

| Fluid | Turbine Wetness [kg/kg] | $W_{exp}$ [kJ/kg] | $W_{pump}$ [kJ/kg] | $W_{net}$ [kJ/kg] | $q_{rec}$ [kJ/kg] | $q_{in}$ [kJ/kg] | *$\eta_{cyc}$ |
|---|---|---|---|---|---|---|---|
| Water | 0.0521 | 567.3 | −0.5 | 566.8 | N/A | 2753.3 | 20.6% |
| Decane | N/A | 155.3 | −0.5 | 154.8 | 213.4 | 525.0 | 29.5% |
| Hexane | N/A | 138.3 | −4.9 | 133.5 | 129.4 | 508.5 | 26.3% |
| **90% Hexane | N/A | 135.8 | −4.9 | 130.9 | 132.3 | 508.5 | 25.9% |

*cycle efficiencies debited using the Baumann Rule (Leyzerovich, A. S. (2005). Wet-steam Turbines for Nuclear Power Plants. Tulsa, OK: Pennwell.)
**90% hexane, 5% pentane, 5% heptane Table 3 shows that the organic Rankine cycle achieves superior efficiency to the steam Rankine cycle. The specific heat transfer into the cycle, $q_{in}$, and the specific work output from the cycle, $w_{net}$, are each much greater for water than for decane. This difference is caused by the substantially larger latent heat of water, which is about 20 times that of decane. Thus, for a given heat source, the decane cycle will require a much larger mass flow than the steam cycle to absorb heat at the same rate. Also, the pump work input for the organic cycle consumes 3.3% of expander work, whereas the pump work input for the steam cycle consumes less than 0.1% of expander output. This means that the decane Rankine cycle is more susceptible to pump inefficiencies than the steam Rankine cycle.

Table 4 contains the state information for an organic Rankine cycle as described above with a working fluid for this cycle comprising a mixture of 90% n-hexane, 5% pentane and 5% heptane. The heat source is waste heat from a plant process at a constant temperature of 240° C., the heat sink is cooling water at a constant temperature of 30° C., and a minimum temperature potential of $\Delta T_{min}$=10° C. is maintained between the working fluid and the source or sink for all states. Pump and expander efficiencies are set at $\eta_{pump}=\eta_{exp}=0.9$. The states correspond to the cycle similar to the decane cycle depicted at FIG. 4.

TABLE 4

Organic Rankine cycle states for a 90% n-hexane mixture working fluid with heat source and sink of 240° C. and 30° C. respectively. The expander and pump have isentropic efficiencies of 0.9.

| State | specific enthalpy h (kJ/kg) | specific entropy s (kJ/kg-K) | Temperature T (° C.) | Pressure P (kPa) | Quality Q |
|---|---|---|---|---|---|
| 1 | −62.664 | −0.1918 | 40 | 41.127 | 0 |
| 2rev | −58.252 | −0.1918 | 40.9 | 2870 | Subcooled |
| 2 | −57.762 | −0.1902 | 41.1 | 2870 | Subcooled |
| 3 | 74.579 | −0.1978 | 95.3 | 2870 | Subcooled |
| 4 | 499.56 | 1.1672 | 229.4 | 2870 | 0 |
| 5 | 580.01 | 1.3272 | 230 | 2870 | 1 |
| 6rev | 429.19 | 1.3272 | 112.1 | 41.127 | Superheated |
| 6 | 311.85 | 1.3658 | 119.4 | 41.127 | Superheated |
| 7 | 311.85 | 0.9963 | 51.1 | 41.127 | Superheated |

Fluid Selection

Choosing the correct fluid for an organic Rankine cycle is desirable to achieve the best possible performance. The choice of fluid will not only affect the efficiency of the cycle, but also the reliability, safety, environmental impact, and cost of the cycle. Below is a discussion of some of the factors to consider when screening fluids.

One of the primary considerations affecting fluid selection is efficiency. The purpose of the ORC is to convert heat into shaft work. Steam is more benign and may have better availability, reliability, and environmental impact than any organic fluid choice, so it is desirable that any alternative to steam output more work than a steam Rankine cycle.

The efficiency of a Rankine cycle depends on the working fluid properties and the heat source and heat sink available to the cycle. To illustrate this, the heat source considered is an exothermic chemical reaction, such as a Fischer Tropsch reaction maintained at constant temperature of $T_{source}$=240° C. The heat sink is cooling water with a mass flow great enough to maintain a constant temperature of $T_{sink}$=30° C. Heat transfer across a temperature gradient is inherently inefficient. Therefore, given the constant temperature heat source and sink described, working fluid should absorb heat as close to $T_{source}$ as possible and reject heat as close to $T_{sink}$ as possible. Fluid properties which help to achieve these heat transfer goals increase cycle efficiency. A minimum temperature difference, $\Delta T_{min}$, is maintained between the working fluid and the heat source or heat sink to assure heat transfer.

Given the constraint on maximum cycle temperature, dry fluids achieve a higher temperature for heat transfer into the system than wet fluids. Dry fluids do not condense when expanded isentropically from a saturated vapor state. Instead, this expansion results in a superheated vapor. In contrast, wet fluids have a negative slope $(dT/ds)_{sat}$ of the saturated vapor line on the T-s diagram. When a wet fluid is expanded from a saturated vapor state, it begins to condense.

Condensation in the expander raises two issues. The liquid condensation droplets cause frictional losses in rotating machinery, so that the efficiency of an expander with internal condensation is lower than the efficiency of an expander with dry gas flowing through it. Also, condensation in an expander causes wear and reduces equipment usable life. For this reason, equipment usually has an allowable condensation limit, and fluid passing through the expander is kept above this limit by superheating before entering the expander.

In contrast, dry fluids exit the expander as superheated vapor at elevated temperature, State 6 in FIG. 4. Directly rejecting heat from State 6 to the cooling water at $T_{sink}$ generates entropy, and could be a disadvantage for dry cycles. Fortunately, most of the heat from the superheated expander exit stream can be recovered in a recuperator from State 6 to State 7, and used to preheat the cold liquid exiting the pump from State 2 to State 3. The use of a recuperator negates the disadvantage of the elevated expander exit temperature for a dry fluid rejecting heat.

While the recuperator reduces entropy generation during heat rejection from the cycle, it also reduces entropy generation during heat absorption by the cycle. The coldest working fluid temperature at which heat is absorbed without the recuperator is $T_2$, but with the recuperator included the coldest temperature at which heat is absorbed is raised to $T_3$. Thus, the heat transfer from the source into the wet fluid occurs from State 2 up to State 5 across a large temperature gradient. The heat transfer from the heat source into the recuperated dry cycle occurs only from State 3 up to State 5, across a much smaller temperature gradient. The recuperator greatly improves the cycle efficiency for a cycle operating between a constant temperature heat source and a constant temperature heat sink.

Figure 5:
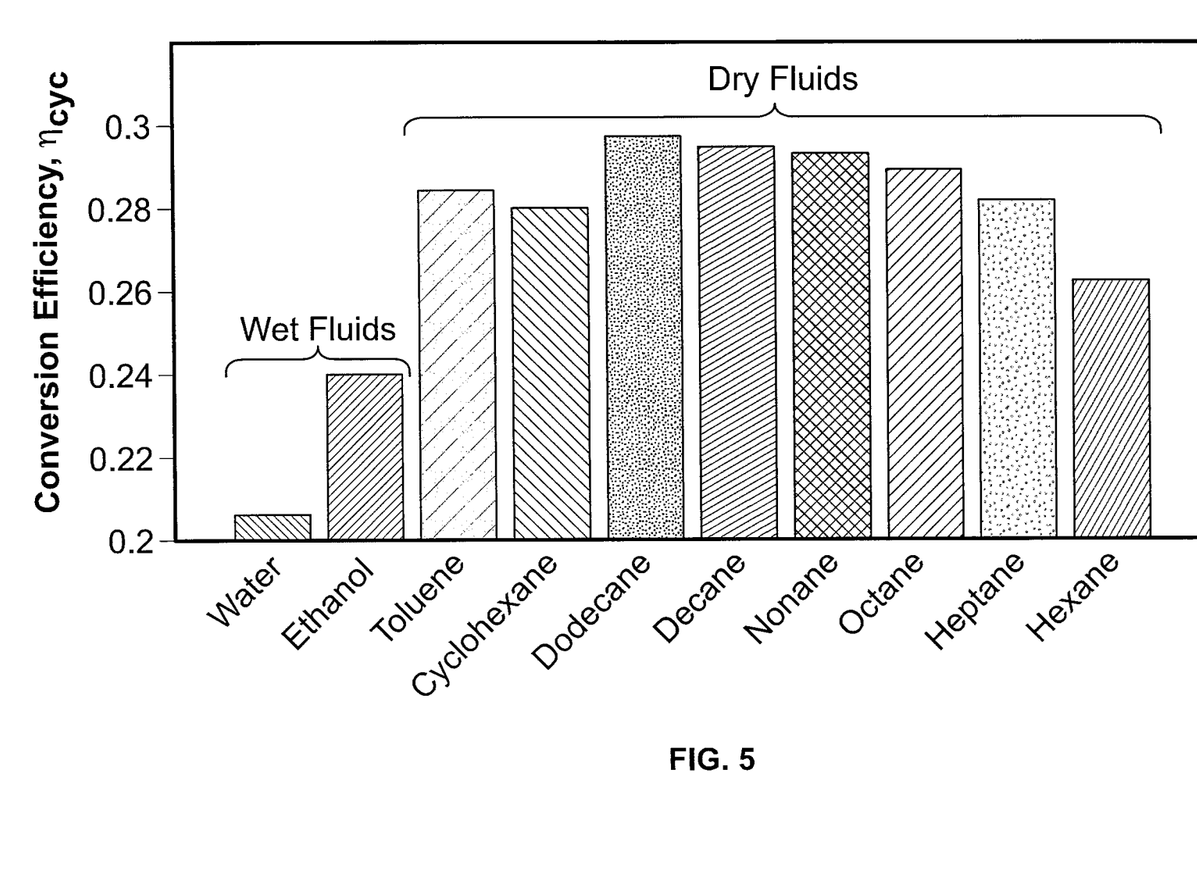
FIG. 5 depicts a chart that shows efficiencies for Rankine cycles using several fluids.

The advantage of dry fluids over wet fluids is illustrated by FIG. 5, which shows efficiencies for Rankine cycles using several fluids. $P_{high}$ for water is 450 kPa to match the low pressure steam level from the plant process simulation model. $P_{high}$ for ethanol is 4698.8 kPa to assure a maximum wetness of 10% at the expander exit. All of the cycles have a $\Delta T_{min}$ of 10° C. resulting in a maximum cycle temperature of $T_{max}$=230° C. and a minimum temperature of $T_{min}$=40° C. Isentropic pump and expander efficiencies of $\eta_{pump}=\eta_{exp}=0.9$. The Baumann rule is in effect for wet fluids.

Referring to FIG. 5, cycle efficiencies are shown for a variety of working fluids for a heat engine operating between a maximum temperature of 230° C. and a minimum temperature of 40° C. The efficiencies range from a low of 20.6% for a water to a high of 29.7% for dodecane. The Carnot efficiency for a cycle operating at these temperatures is 37.8%. Dry fluids exhibit a clear efficiency advantage over wet fluids in FIG. 5. Dry fluids can be further characterized to narrow the field of potential working fluid choices.

Fluids with higher critical temperatures will often require greater latent heat input than fluids with lower critical temperature. This increased latent heat associated with increasing critical temperature, $T_{crit}$, allows heat to be absorbed at higher temperatures and may result in higher cycle efficiency. Baseline ORC efficiency is shown with the working fluid critical temperature in Table 5 below for select fluids. The efficiencies shown are based on the previously stated assumption of a constant temperature heat source at 240° C., a heat sink at 30° C., pump and expander efficiency at 0.9 and the recuperator is included.

TABLE 5

Critical pressures, critical temperatures, triple point temperatures and normal boiling point temperatures for selected fluids.

| Fluid | $P_{crit}$ (kPa) | $T_{crit}$ [° C.] | $T_{boil}$ [° C.] | Cycle Efficiency [%] |
|---|---|---|---|---|
| Water | 22064.0 | 373.95 | 99.98 | 20.6 |
| Toluene | 4126.3 | 318.6 | 110.6 | 28.4 |
| Cyclohexane | 4075.0 | 280.49 | 80.74 | 27.9 |
| Dodecane | 1817.0 | 384.95 | 216.15 | 29.7 |
| Decane | 2103.0 | 344.55 | 174.12 | 29.5 |
| Nonane | 2281.0 | 321.4 | 150.76 | 29.3 |
| Octane | 2497.0 | 296.17 | 125.62 | 28.9 |
| Heptane | 2736.0 | 266.98 | 98.38 | 28.2 |
| Hexane | 3034.0 | 234.67 | 68.71 | 26.3 |

There are a number of important fluid considerations which may not change the thermodynamic efficiency of an organic Rankine cycle, but affect the reliability of the cycle. A brief discussion of triple point temperature and chemical stability follows.

Any compound chosen as a working fluid must be chemically stable within the temperature and pressure ranges of the cycle. Degradation of a working fluid can change its thermodynamic properties rendering the cycle unpredictable and ineffective. Some products of organic decomposition may cause coking and block equipment passages if not removed. Dehydrogenation can be a particularly challenging issue for hydrocarbons as temperatures increase. Hydrogen gas may become trapped in the condenser, where it interferes with heat transfer and takes up volume. Consequently, the pressure and the temperature in the condenser increase, resulting in a decreased pressure ratio across the expander and a degradation of work output.

Thermal stability of organic compounds may be greatly reduced by the presence of oxygen, such that air and water leakages into an ORC are undesirable. If the cycle is maintained at a pressure greater than or equal to its environment, all system leakages will be outward. The normal boiling point temperature, $T_{boil}$, helps to quickly identify fluids which will maintain pressures higher than atmospheric pressure as they condense. Select normal boiling temperatures are listed in Table 5. The normal boiling point is the saturation temperature of a fluid at atmospheric pressure, and therefore it is the lowest possible condensation temperature, $T_{min}$, which can be used if the cycle is to remain above atmospheric pressure.

The thermal stability limitations of many fluids have been studied for organic Rankine cycle applications, including various refrigerants (Calderazzi & di Paliano, Thermal stability of R-134a, R-141b, R-1311, R-7146, R-125 associated with stainless steel as a containing material. *International Journal of Refrigeration,* 20 (6), 381-389 (1997); Morgan, Mills, Zakak, Reinhold, & Carr, *Determination of the Thermal Stability of Organic Working Fluids Used in Rankine-Cycle Power Systems for Solar Cooling.* Waltham, Mass.: Thermo Electron Corp., 1982); pentanes (Andersen & Bruno, Rapid Screening of Fluids for Chemical Stability in Organic Rankine Cycle Applications. *Industrial Engineering and Chemistry Research ,* 5560-5566, 2005) and other hydrocarbons and hydrofluorocarbons (Jain, Demirgian, Krazinski, Bushby, & Mattes, *Determination of Thermal-Degradation Rates of Some Candidate Rankine-Cycle Organic Working Fluids for Conversion of Industrial Waste Heat into Power.* Argonne Nat'l Lab., 1984). These papers generally conclude that thermal stability of working fluids for ORC applications is fluid specific, with allowable temperature limits ranging from 90° C. up to 396° C. Degradation often results in the build up of non-condensable gases in the condenser. Methods for reducing known degradation rates have also been studied (Doty & Siddarth, A Dual-Source Organic Rankine Cycle (DORC) for Improved Efficiency in Conversion of Dual Low- and Mid-Grade Heat Sources. *Proceedings of the ASME 2009 3rd International Conference of Energy Sustainability,* San Francisco, Calif. 2009). Doty goes so far as to claim that organic working fluids can be used at temperatures as high as 527° C. (800° K) if proper precautions are taken. The allowable rate of decomposition for a working fluid depends on the frequency with which the fluid will be refreshed for a given application. A review of major ORC technologies lists acceptable heat source temperatures ranging from 80° C. up to 400° C., with most units targeted at heat sources in the 100° C. to 300° C. range. See, Quoilin, Sylvain, and Vincent Lemort. "*Technological and Economical Survey of Organic Rankine Cycle Systems.*" 5th European Conference on Economics and Management of Energy in Industry, Vilamoura, Algarve, Portugal (14-17 Apr 2009).

Any practical system design requires a consideration of the cost for implementation. Fluids should be commercially available, so that the material cost of the working fluid itself is not prohibitive. In an embodiment of the present invention, the working material is prepared from the plant products, so that it need not be commercially available. Also, fluids with low volume flows allow for smaller equipment sizes. Low volume flow fluids can be identified by their high critical temperature, their high critical pressure, and their low boiling temperature.

For similar fluids, a higher critical temperature corresponds to a larger latent heat. Thus, a fluid with a high critical temperatures will typically require a smaller mass flow than a fluid with a lower critical temperature to achieve a given heat transfer rate into the fluid. Furthermore, a high critical pressure, $P_{crit}$, for a fluid corresponds to a high saturation pressure at the maximum temperature. Vapors at high pressure are more dense than vapors at low pressure, so the same mass flow requires a lower volume flow rate than for a fluid at high pressure. If the pressure is too high, then wall thicknesses required for tubes and equipment will begin to drive costs up. The critical pressure of water, 22064 kPa, provides a reasonable ceiling for working fluid critical pressure, and the organics considered here all have lower critical pressures than water. Select critical pressures are listed in Table 5.

A low boiling temperature corresponds to a high pressure in the condenser, which increases the density of the fluid in the condenser and decreases the volume flow. Table 6 above contains critical pressures for some organics as well as water.

The hydrocarbons ranging in size from hexane to decane, included in Table 5, have decreasing critical pressure with increasing size. These same alkanes have increasing normal boiling point with increasing size. Both of these trends make organic Rankine cycles using lighter alkanes such as hexane less expensive than ORC's using heavier alkanes such as decane.

At numerous plants, a constant temperature heat source at or about 240° C. is available for conversion into work by an organic Rankine cycle. Thermodynamic performance is a primary consideration for fluid selection. High critical temperature also correlates positively with ORC conversion efficiency, making longer chain hydrocarbons such as decane more efficient than smaller hydrocarbons such as hexane.

Fluid choice will also greatly affect the cost of ORC equipment, with high critical pressure and low normal boiling temperature being desirable qualities. Small chain hydrocarbons such as hexane will allow smaller equipment and less capital cost than longer chain hydrocarbons such as decane.

Desirable organic working fluids may have a $T_{boil}$ between about 20° C. and 220° C., preferably between about 30° C. and about 100° C. Other desirable organic working fluids may have a $T_{crit}$ between about 190° C. and 350° C. The $T_{crit}$ should be above the temperature of the vaporized coolant exiting the Fischer Tropsch reactor exchanger, desirably more than 5° C. above and preferably more than 10° C. above the vaporized coolant temperature of the reactor. Mixtures of hydrocarbons fluids meeting these criteria may also be selected as the organic working fluid, though it is preferable to have one predominant component and a narrow $T_{boil}$ range or a narrow $T_{crit}$ range for the mixture within the ranges noted above.

The above described process may have several advantages. Waste heat from Fischer Tropsch reactors is often used for steam generation. However, medium pressure steam requires superheat which may be unavailable, and low pressure steam is an inefficient medium for converting heat to work. An organic Rankine cycle in the configuration described above using hexane as a working fluid has a conversion efficiency of 26.2%. This compares favorably with a steam Rankine cycle using the same heat source, which has a conversion efficiency of 20.7%. Using an organic coolant that is taken from the reactor product stream also has the advantage that leaks between the shell side and the tube side of the reactor have little consequence. The Fischer Tropsch plant provides an immediate source of working fluid such that the organic fluid can be continuously recycled to maintain the integrity of the working fluid which might otherwise break down over time.

The ORC can be further integrated into a Fischer Tropsch plant by constructing a customized cycle that targets the temperature profile available from the FT reactor heat source and other heat sources in the plant. A typical Fischer Tropsch plant may include the Fischer Tropsch reactor circuit, the reformer and related processes and equipment, such as product distillation unit and hydrocracker. The reactor is the largest single heat source being used, and the other heat sources can range from the temperature at which the ORC condenses (about 20° C. minimum) up to roughly 350° C. or 400° C. at the hottest. At temperatures above 400° C., the organic working fluid will be unstable, and steam will probably start to be more efficient. As may be understood by one skilled in the art from the present disclosure, the heat requirement profile of the ORC may be manipulated to match the heat source by routing the working fluid through the cycle to achieve the best possible recuperation. Between multiple expander stages, the working fluid may be reheated within separate passes of the FT reactor exchanger or with other heat sources, to absorb more heat at the FT reactor temperature. The ORC may include an extra pressure level to use all of the heat available in the plant to temperatures as low as 100° C. The high pressure coolant may be heated up to near reactor temperature with heat sources other than the reactor exchanger, for example the reactor product stream. These changes utilize multiple heat sources from the FT plant, where the FT reactor provides about 75% of the ORC heat load. This may yield a customized cycle which converts the FT heat source with an efficiency of 28.5% when using hexane as the working fluid.

Embodiments of the invention have been described above to illustrate various aspects of the invention, and are not intended to limit the invention to the described embodiments, examples or illustrations. Those skilled in the art may appreciate additional advantages, features and equivalents that are within the scope of the invention as defined by the claims appended hereto.

The invention claimed is:

1. A process for the recovery of waste heat comprising:
introducing a stream of an organic liquid coolant into a cold side of a reactor heat exchange system, where the coolant provides cooling of the reactor by vaporization of the coolant into a coolant vapor stream;
removing the coolant vapor steam from the cold side of the reactor heat exchange system;
introducing the coolant vapor stream into an organic Rankine cycle to recover work and convert the coolant vapor stream into a high pressure liquid coolant; and
introducing the high pressure liquid coolant into the organic liquid coolant stream, the organic liquid coolant being derived from a fraction of a hydrocarbon product formed in the reactor.

2. The process of claim 1 wherein the reactor is a Fischer Tropsch reactor.

3. The process of claim 2 wherein the reactor is a fixed bed Fischer Tropsch reactor.

4. The process of claim 2 wherein the reactor is a slurry Fischer Tropsch reactor.

5. The process of claim 2 wherein the reactor is a fluid bed reactor.

6. The process of claim 1 wherein the organic liquid coolant comprises at least 80% of a $C_6$-$C_{12}$ hydrocarbon.

7. The process of claim 6 wherein the organic liquid coolant comprises at least 90% of a $C_6$-$C_{12}$ hydrocarbon.

8. The process of claim 6 wherein the organic liquid coolant comprises at least 95% of a $C_6$-$C_{12}$ hydrocarbon.

9. The process of claim 6 wherein the organic liquid coolant comprises at least 90% of non-aromatic $C_6$ hydrocarbon.

10. The process of claim 1 wherein the organic liquid coolant has a critical temperature ($T_{crit}$) that is between 190° C. and 350° C.

11. The process of claim 1 wherein the organic liquid coolant has a critical temperature ($T_{crit}$) that is at least 5° C. greater than the temperature of the coolant vapor stream removed from the cold side of the reactor heat exchange system.

12. The process of claim 1 wherein the organic liquid coolant has a critical temperature ($T_{crit}$) that is greater than the reaction temperature of the reactor.

13. The process of claim 1 wherein a product stream from the reactor is separated into a plurality of fractions including a coolant fraction, introducing the coolant fraction as a make-up into the organic liquid coolant stream, and bleeding off a purge stream from the liquid coolant stream.

14. The process of claim 13 wherein the coolant fraction has a saturation temperature close to the reactor temperature when at the same pressure as the cold side of the reactor heat exchange system.

15. The process of claim 13 wherein the coolant fraction has a boiling point temperature ($T_{boil}$) that is between 30° C. and 100° C.

16. The process of claim 13 wherein the coolant fraction comprises primarily $C_6$-$C_{12}$ hydrocarbons.

17. The process of claim 13 wherein the coolant fraction comprises a naphtha fraction having a boiling point temperature ($T_{boil}$) range that is between 20° C. and 220° C.

18. The process of claim 13 further comprising introducing the purge stream into the product stream.

19. The process of claim 1 wherein the organic Rankine cycle comprises the steps of:
introducing the coolant vapor stream into an expander under near isentropic conditions to form a superheated vapor;

introducing the superheated vapor into a recuperator on a hot side;

condensing the superheated vapor into a liquid coolant stream;

pumping the liquid coolant stream through the recuperator on a cold side; and introducing the liquid coolant into a recirculating stream of coolant.

20. The process of claim 1 wherein the temperature of the reactor is maintained between 100° C. and 350° C.

21. The process of claim 1 wherein the temperature of the reactor is maintained between 220° C. and 250° C.

22. The process of claim 1 wherein the temperature of the coolant vapor stream is condensed into a liquid coolant at a temperature between 20° C. and 50° C.

23. The process of claim 19 wherein the expander comprises a multi-stage expander and the superheated vapor between at least one stage of the expander is heated from a source other than the reactor.

24. The process of claim 1 further comprising increasing the temperature of the high pressure liquid coolant by heat exchange from a source of heat other than the reactor.

25. The process of claim 1 wherein the coolant is vaporized in the reactor in the cold side of the reactor heat exchange system.

* * * * *